(No Model.)
W. A. MURPHY.
CLUTCH.
No. 533,602. Patented Feb. 5, 1895.
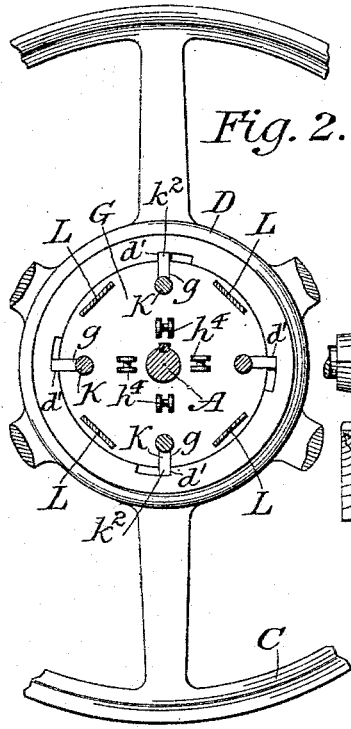
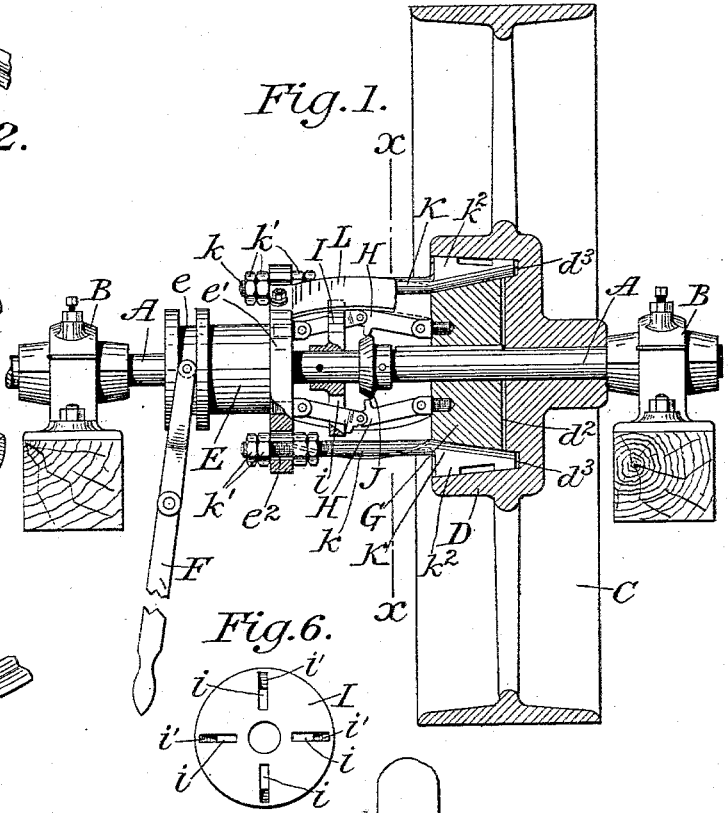
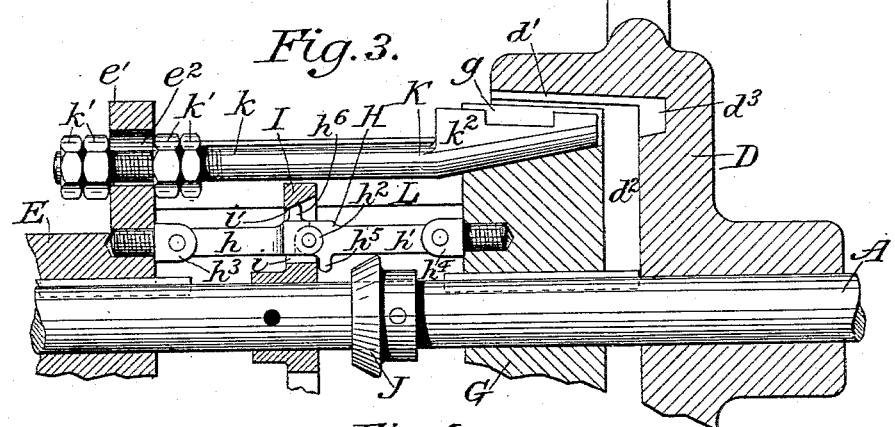
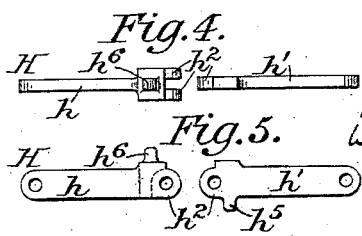
Attest:
D. Petri-Palmedo
A. N. Jesbera
Inventor:
William A. Murphy
by William B. Greeley
Att'y.

UNITED STATES PATENT OFFICE.

WILLIAM A. MURPHY, OF BROOKLYN, NEW YORK.

CLUTCH.

SPECIFICATION forming part of Letters Patent No. 533,602, dated February 5, 1895.

Application filed May 28, 1894. Serial No. 512,651. (No model.)

*To all whom it may concern:*

Be it known that I, WILLIAM A. MURPHY, of Brooklyn, in the county of Kings and State of New York, have invented certain new and useful Improvements in Clutches; and I do hereby declare that the following is a full and exact description thereof, reference being had to the accompanying drawings, and to the letters of reference marked thereon, making a part of this specification.

This invention relates to devices whereby a rotary driver may be coupled to and transmit motion to a driven part, such as a pulley or shaft. In certain classes of machines, especially in those in which the work done is very heavy, it is desirable that movement should be imparted to the driven part gradually and that thereafter the driver should become positively locked to the driven part, thereby necessitating a frictional engagement at the outset with a positive engagement later.

It is the object of my invention to produce a clutch which shall answer these requirements and shall at the same time be simple in construction, durable and efficient.

The nature of the improvements will be more particularly pointed out hereinafter and set forth in the claims.

In the accompanying drawings: Figure 1 is a view partly in side elevation and partly in longitudinal section and representing the application of the improved clutch to a shaft and pulley. Fig. 2 is a section on the line $x-x$ of Fig. 1, portions of the pulley being broken away to save space. Fig. 3 is an enlarged detail of the clutch in longitudinal section, the parts being represented as out of engagement. Figs. 4 and 5 are detail views of the toggle levers hereinafter referred to, the scale being the same as that of Fig. 3: Fig. 6 is a front view on the same scale as that of Fig. 1, of the disk which insures the return of the toggle levers to their proper position when the clutch is open.

In the drawings the driven part is represented as a shaft A mounted in bearings B, B, and adapted to receive the driving pulley C which is mounted loosely on said shaft. The pulley is represented as having formed thereon with a hub D which constitutes the female member of the clutch, but it will be understood that the hub might be formed independently of the pulley and that it might be secured to an independent shaft if so desired. The hub is recessed, as represented, the peripheral wall of said recess being preferably tapered inwardly somewhat. At intervals the wall of the recess is formed with shoulders $d'$, $d'$, for engagement with keys carried by the other member of the clutch in the manner hereinafter described. The shoulders $d'$, $d'$ are preferably formed by grooving the wall of the recess in the manner represented. The bottom or end $d^2$ of the recess in the hub may also be provided with pits $d^3$ to receive the ends of the keys above referred to, thereby making the positive engagement of the two parts of the clutch more secure.

Splined upon the shaft A so as to rotate therewith and to be free to move longitudinally thereon is a head E which is grooved annularly, as at $e$, for engagement with the actuating lever F, and is preferably provided with a flange $e'$ for the convenient attachment of the parts hereinafter referred to. The male member G of the clutch is also splined upon the shaft A so as to rotate therewith and to be free to move longitudinally thereon, and is connected to the head E through intermediary of toggle levers H, H, the two members $h$, $h'$ of each toggle lever being preferably connected with a rule joint as represented at $h^2$, while the other extremities are pivoted to bolts $h^3$, $h^4$, respectively tapped into the head E and into the male member G. The toggle levers are guided in the radial slots $i$, $i$, of the disk I which is secured to the shaft A. Near the joint one or the other of the members $h$, $h'$ is provided on its inner side with a projection $h^5$ which in the longitudinal movement of the toggle levers with respect to the shaft A, will strike upon a tapering or wedge-like collar J which is secured upon the shaft A, thereby causing the joint to be thrust outwardly and the male member of the clutch to be released from pressure through the toggle levers. The outer end of each slot $i$ is formed with an incline $i'$ to co-operate in a similar manner with a projection $h^6$ on the outside of one or the other of the members $h$, $h'$, and thereby will insure the return of both members into the same straight line when the head E is drawn back.

To the head E are attached one or more keys K which are guided in slots $g$, $g$, formed in the periphery of the male member G of the clutch and are adapted to lock the same positively to the hub D. Preferably each key K has a stem $k$ which passes through a radial slot $e^2$ in the flange $e'$ so that it may move to some extent therein toward or from the axis of the shaft A, lock-nuts $k'$, $k'$, being provided to retain the key in proper longitudinal position. The extremity of the stem $k$ is formed with a leaf $k^2$ and the bottom of the guide slot in which it rests is preferably inclined outwardly so that as the key is moved with respect to the male member G it is at the same time thrust outwardly and thereby caused to engage with the shoulder $d'$ on the inner wall of the hub D.

Stiff plate springs L, L, are secured at one end to the head E and at the other end abut against the male member G of the clutch, the springs being bent outwardly somewhat, as clearly indicated in Fig. 1.

The operation of the clutch will now be described, it being supposed that the clutch is in its normal or open condition, with the parts in the positions represented in Fig. 3. When the lever F is shifted to thrust the head E toward the driving part C the first effect is to thrust the male member G of the clutch toward the female member or hub D, the members $h$, $h'$ of the several toggle levers being then in the same straight line. This movement of the male member G is sufficient to force it into contact with the hub D and to start the driven part by such frictional contact. There is up to this point no movement of the keys K with respect to the member G and consequently the keys are not forced outwardly to make positive engagement with the hub D. Just as the member G, however, reaches the limit of its movement the projections $h^5$ strike the wedge-like collar J and are thrust outwardly thereby releasing the member G from the pressure transmitted through the toggle levers and causing all the pressure thereon to be exerted through the springs L, L. The effect, therefore, of the further movement of the head E is to increase the pressure upon the member G and to produce a firmer engagement of the same with the hub D. As the head E now moves with respect to the member G the keys K are thrown outwardly through the influence of the inclined bottoms of the slots $g$, $g$, and, accordingly, when the pressure of the member G against the hub D has increased to such an extent as to cause the former to move substantially at the same speed with the latter, the said keys K will be thrown out far enough to engage the shoulders $d'$ of the hub and thereby to make a positive engagement between the members of the clutch. As represented in Fig. 1 the extremities of the keys K, K, may also be arranged to enter the pits $d^3$, $d^3$, in the end $d^2$ of the hub D. The stems $k$, $k$, of the keys K, K, may slide outwardly in the slots $e^2$, $e^2$, to permit the required movement of the plates $k^2$, $k^2$, or the stems may themselves be sufficiently elastic to permit such movement of the plates. In opening the clutch the keys are first drawn out of engagement by the rearward movement of the head E and then, through the toggle levers H, H, the member G is drawn out of contact with the driving member D and at the same time through the co-operation of the projections $h^6$, $h^6$, with the inclines $i'$, $i'$, the members of the toggle levers are brought back into a straight line in readiness for the next operation of the clutch.

The particular form and arrangement of parts which are represented in the drawings have been found to be convenient and desirable, but it will be understood that they may be varied more or less without departing from the spirit of my invention.

I claim as my invention—

1. In a clutch, the combination with a shaft, one clutch member splined on said shaft and a second clutch member, of a head mounted on said shaft, means to thrust the same toward said clutch members, springs secured to said head and abutting against one of said clutch members, toggle levers interposed between said head and said clutch member, the parts of said toggle levers standing normally in straight lines and transmitting the thrust from said head to said clutch member, and means to throw the members of said toggle levers out of line, substantially as shown and described.

2. The combination with a shaft, a clutch member splined on said shaft, and a second clutch member, of a head mounted on said shaft, means to thrust the same toward said clutch members, keys carried by said head and adapted to effect engagement between said clutch members, and springs secured to said head and abutting against one of said clutch members, whereby as said head is thrust forward said clutch member is first thrust by said springs against the second member and then in the continued movement of the head and springs will yield and the keys be caused to effect engagement between the clutch members, substantially as shown and described.

3. The combination with a shaft, a clutch member mounted thereon and a second clutch member, of a head mounted on said shaft, means to thrust said head toward said clutch members, keys carried by said head and adapted to effect engagement between said clutch members, and springs secured to said head and abutting against one of said clutch members, toggle levers interposed between said head and said clutch member and means to throw out said toggle levers as they are moved forward whereby the thrust is transmitted to the springs and in the continued movement of the head and keys are forced forward to effect engagement between the members, substantially as shown and described.

In testimony whereof I have signed my name to this specification in the presence of two subscribing witnesses.

WILLIAM A. MURPHY.

Witnesses:
 A. N. JESBERA,
 A. WIDDER.